United States Patent [19]

Hasegawa et al.

[11] Patent Number: 5,593,535
[45] Date of Patent: Jan. 14, 1997

[54] APPARATUS FOR PRODUCING CORRUGATED TUBE

[75] Inventors: Noboru Hasegawa, Ichihara; Mitsuo Kagabu, deceased, late of Ichihara; Setsu Kagabu, heir, Akita, all of Japan

[73] Assignee: Toyo Chemical Co., Ltd., Kanagawa-Ken, Japan

[21] Appl. No.: 256,620

[22] PCT Filed: Nov. 8, 1993

[86] PCT No.: PCT/JP93/01616

§ 371 Date: Nov. 21, 1994

§ 102(e) Date: Nov. 21, 1994

[87] PCT Pub. No.: WO94/11180

PCT Pub. Date: May 26, 1994

[30] Foreign Application Priority Data

Nov. 13, 1992 [JP] Japan .................... 4-328723
Nov. 13, 1992 [JP] Japan .................... 4-328724

[51] Int. Cl.$^6$ .............. B29C 47/88; B29C 53/22; B29C 53/62; B29C 53/72
[52] U.S. Cl. .............. 156/428; 156/189; 156/195; 156/244.15; 156/498; 425/366; 425/369
[58] Field of Search .............. 156/428, 462, 156/498, 500, 429–432, 187–190, 195, 200, 201, 210, 244.13, 244.15, 244.24, 292, 294; 264/167, 210.1, 210.2, 281, 286; 425/327, 336, 366, 369

[56] References Cited

U.S. PATENT DOCUMENTS

| | | | |
|---|---|---|---|
| 2,398,876 | 4/1946 | Bailey | 156/189 X |
| 3,532,580 | 10/1970 | Kanao | 156/429 X |
| 4,292,113 | 9/1981 | Hirata | 156/428 |
| 4,575,400 | 3/1986 | Ueda et al. | 156/428 |

*Primary Examiner*—Adrienne C. Johnstone
*Attorney, Agent, or Firm*—Darby & Darby, P.C.

[57] ABSTRACT

An apparatus for producing a corrugated tube contains a roller assembly composed of plural rollers having plural convexed rings, respective convexed rings forming a helix as a whole so as to substantially form a single rotating shaft body, and a synthetic resin supplier for supplying a strip of synthetic resin onto the roller assembly. The pitches between the convexed rings, and the diameters and the widths of the convexed rings are so constructed as to be gradually decreased in accordance with the contraction percentage of the synthetic resin. The apparatus is provided with a follower ring on a roller valley portion between the convexed rings, the follower ring being rotatable in response to circumferential speed of the apex of the convexed ring.

12 Claims, 5 Drawing Sheets

APPARATUS FOR PRODUCING CORRUGATED TUBE

TECHNICAL FIELD

This invention relates to an apparatus for producing a corrugated tube of synthetic resin. More particularly, it relates to an apparatus for producing a corrugated tube in which the cross-sectional shape of the outer circumferential surface of the tube is corrugated and which exhibits good flattening strength and especially high molding stability and high durability.

BACKGROUND TECHNOLOGY

Various proposals have hitherto been made for an apparatus for producing a corrugated tube of synthetic resin so that the outer circumferential surface of the tube has a corrugated cross-sectional profile. For example, there is known an apparatus comprising a roller assembly made up of plural rollers forming an imaginary cylinder, the rollers being each provided with plural convexed rings of the same size, and being rotated about their own axes at equal speed. The rollers are arranged parallel to one another so that the axes of the rollers are on the circumference surface of the imaginary cylinder and. The axial directions of the rollers are circumferentially inclined and parallel to one another. A die is provided for continuously supplying a strip of synthetic resin in a molten state from the lateral side onto the periphery of the roller assembly. A driving motor continuously rotates the rollers at equal speed. There is also known an apparatus (Japanese Patent Publication No. 62-60261 (1987)) which further comprises a pressure roller profiled for meshing with the profile of the outer wall surface of each roller for fixing the shape of the strip of synthetic resin, means for cooling the synthetic resin as it is shaped to a tubular profile as it is moved along the outer periphery of the imaginary cylinder, and forming means for forming a smooth cylindrical-shaped synthetic resin on the inner side of the corrugated tube for providing a double-walled structure.

However, with the above-described known apparatuses, as the strip of synthetic resin is wound spirally and advanced along the axis of the roller assembly while being cooled and cured, the strip itself contracts in size due to cooling. Since the convexed rings formed on each roller are of the same size and arrayed at an equal interval on the roller, the synthetic resin strip is actually being cured under conditions in which the strip is pulled outwardly along the shape of each convexed ring. The result is that, as the strip of synthetic resin progresses axially along the roller assembly, the strip tends to be detached from the valley portions between the convexed rings to detract from molding stability, accuracy and durability of the ultimate corrugated tube.

Besides, with the above-described known apparatus, although each roller of the roller assembly is rotated at equal speed, a difference in circumferential speed of about 10 to 45% is produced between (a) circumferential speed at the apex of the convexed portion and (b) speed in the recessed interstices between neighboring convexed portions of each roller, so that longitudinal creases (internal strain) are produced between the convexed portions and the recessed valley portions of the wall surfaces of the corrugated tube. As a result, the corrugated tube produced is lowered in durability, such as by reduced impact strength or pressure resistance.

DISCLOSURE OF THE INVENTION

It is an object of the present invention to provide an apparatus for producing a corrugated tube which is capable of preventing a strip of synthetic resin from being detached from the rollers due to contraction in size and which is superior in durability, such as by increased impact strength or pressure resistance.

It is another object of the present invention to provide an apparatus for producing a corrugated tube which is superior in durability, such as by increased impact strength or pressure resistance and in which longitudinal creases (internal strain) between the convexed portions and the valley portions thereof are not formed.

According to the present invention, there is provided an apparatus for producing a corrugated tube comprising a roller assembly composed of a plurality of rollers, each being rotatable at equal speed. The roller assembly substantially forms a single rotating axial body so that the rollers means are arrayed on a cylindrical surface of an imaginary cylinder. Roller supporting means are mounted axially opposite the roller assembly for rotatably supporting the rollers. Means are provided for continuously supplying a synthetic resin strip to the outer circumferential surface of the roller assembly from a lateral side thereof. Driving means are provided for rotating the rollers at equal speed. Each axis of the rollers is inclined in a circumferential direction of the roller assembly. Plural convexed rings are provided along the axial direction of each of the rollers arrayed so that the convexed rings form a helix in their entirety. The pitch between the convexed rings and diameters and widths of the convexed rings on each of the rollers is gradually reduced in accordance with contraction percentage of said synthetic resin strip at least within a section of said rollers means in which the synthetic resin strip which is spirally wound and advanced along the axis of the roller assembly is contracted (referred to hereinafter as a first apparatus).

According to the present invention, there is further provided an apparatus for producing a corrugated tube comprising a roller assembly composed of plural rollers, each being rotatable at equal speed. The roller assembly substantially forms a single rotating axial body so that the rollers are arrayed on a cylindrical surface of an imaginary cylinder. Roller supporting means are mounted axially opposite the roller assembly for rotatably supporting said rollers. Means are provided for continuously supplying a synthetic resin strip to the outer circumferential surface of the roller assembly from a lateral side thereof. A Driving means are provided for rotating the rollers at equal speed. Each axis of the rollers is inclined in a circumferential direction of the roller assembly. Plural convexed rings are provided along the axial direction of each of the rollers arrayed so that the convexed rings form a helix in their entirety. A follower ring is provided at a recessed valley portion between neighboring convexed rings. The follower ring is rotatable responsive to the circumferential speed at an apex of the convexed ring (referred to hereinafter as a second apparatus).

According to the present invention, there is also provided an apparatus for producing a corrugated tube which corresponds to the first apparatus fitted with the aforementioned follower ring (referred to hereinafter as the third apparatus).

In each of the apparatuses for producing the corrugated tube, a pressure roller having a convexed shape mating with the convexed shape of the rollers may be provided for fixing the shape of the strip winding in a helix.

In each of the apparatuses for producing the corrugated tube, the cross-sectional shape of the circumferencial surface of the tube coincident with the convexed shape of the plural rollers is corrugated. An inner cylindrical synthetic resin forming means may be provided for forming a smooth cylindrical synthetic resin on the inner side of the corrugated tube wall surface, that is on the inner peripheral surface of the imaginary cylinder, for providing a dual wall for the corrugated tube. Besides, cooling means may be provided within each roller and within the inner cylindrical synthetic resin forming means for cooling the strip of synthetic resin as it is wound.

In each of the above-described apparatuses for producing the corrugated tube, it suffices if each axis of the rollers is circumferentially inclined relative to the axis of the roller assembly at an angle of inclination which allows the strip of synthetic resin to be moved continuously in the axially extending direction of the roll assembly for continuously producing the spiral-shaped tube. In addition, each axis of the rollers may be circumferentially inclined relative to the axis of the roller assembly, while at the same time each axis of the rollers may be equally inclined toward the central axis of the roller assembly so that the diameter of the imaginary cylinder is decreased gradually in the axially extending direction. By inclining the rollers so that the imaginary cylinder is decreased gradually in diameter, it becomes possible to prevent the molding stability and accuracy from being lowered due to the contraction caused by cooling of the strip of synthetic resin. At least one of the roller supporting means may be provided with inclination angle adjustment means for adjusting the angle of inclination of the rollers.

The synthetic resin employed for each of the above-described apparatuses for producing the corrugated tube is preferably thermoplastic resin, such as polyethylene, polypropylene or polyvinyl chloride. Incidentally, the strip of synthetic resin may be a flat strip when supplied from the supplying means or may be supplied in a corrugated form mating with the corrugations of the rollers.

In the above-described first and third apparatuses, the pitch between the convexed rings, and the diameters and the widths of the convexed rings may be decreased gradually in accordance with the contraction percentage of the strip of synthetic resin. Thus it becomes possible to prevent the strip from becoming detached from the recessed valley portions between the neighboring convexed rings of the rollers due to contraction of the synthetic resin, which would otherwise occur if the convexed rings on the rollers were of the same size and arrayed at equal intervals. As a result the corrugated tube produced is improved by increased molding stability, accuracy and durability. The rate of decrease of the pitch between neighboring convexed rings and the diameters and widths of the convexed rings may be selected depending on the type of synthetic resin employed. For example, if a general-purpose polyethylene is employed as a substrate for the strip of synthetic resin, it has a molding shrinkage percentage of approximately 2% and is contracted by about 10% after being wound, depending on the tension applied when the strip is being wound, so that the rate of decrease may be set depending on the contraction percentage. While the rate of decrease varies depending on the synthetic resins employed, when the pitch between the convexed rings and the diameter and the width of the convexed ring at the synthetic resin strip supplying position is equal to X, and the minimum value is equal to Y, the ratio Y/X is given by $0.8<Y/X<1$ and especially $0.9<Y/X<1$.

The section or range within which the pitch between the convexed rings and the diameter and the width of the convexed rings are to be reduced needs only to be at least such a section within which contraction due to curing of the strip of synthetic resin takes place as the strip is spirally wound along the length of the rollers. For those convexed rings which come into use as shape retention means for the spirally wound tube after the termination of shrinkage or curing of the strip of synthetic resin, it is not necessary to change the above values, so that the convexed rings of the same shape may be arranged with the same uniform pitch.

The follower ring which is employed in the above-described second and third apparatuses and which may be rotated responsive to the circumferential speed of the apex portions of the convexed rings, prevents longitudinal creases (internally as strains) from occurring between the convexed portions and valley portions of the wall surface of the corrugated tube due to the rollers making up the roller assembly being rotated at an equal speed to produce a difference in the circumferential speed on the order of about 10 to 45% between the apex point of the convexed ring and the valley portions between the rings for improving durability such as increased impact strength or pressure resistance. There is no particular limitation to the follower ring if it is capable of being rotated at the circumferential speed of the strip of synthetic resin at the apex point of the convexed ring so that when the strip travels in contact with the convexed portions of the rollers and the valley portions, the strip may be rotated at an equal circumferential speed at the apex point and at the valley portion without regard to the rotational speed of the shafts of the rollers. Thus, the follower rings may be formed as rings freely rotatably mounted on the valley portions via bearings or the like.

BEST MODE FOR PRACTICING THE INVENTION

Figure 1:
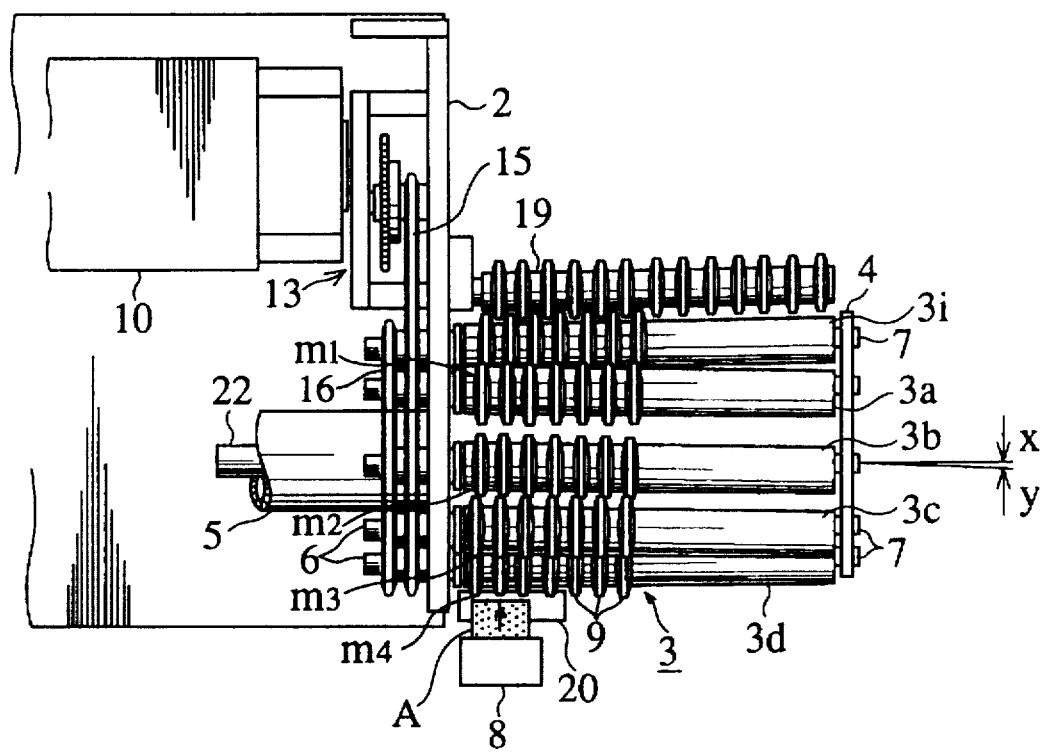
FIG. 1 is a schematic side elevational view showing an apparatus for producing a corrugated tube according to an embodiment of the present invention.

The present invention will be explained hereinbelow by referring to the drawings showing a preferred but non-limitative form of the invention.

In FIG. 1, 1 is an apparatus for producing a corrugated tube comprised of a supporting frame 2, a disk-shaped supporting plate 4 opposed to the supporting frame 2, nine rollers 3a to 3i making up a roller assembly 3, which is arranged along an imaginary circle between the supporting frame 2 and the supporting plate 4 and which substantially forms a single rotating shaft body, a motor 10 for rotating the rollers 3a to 3i at equal speed and a die 8 for supplying a strip of synthetic resin A to the roller assembly 3.

Figure 2:
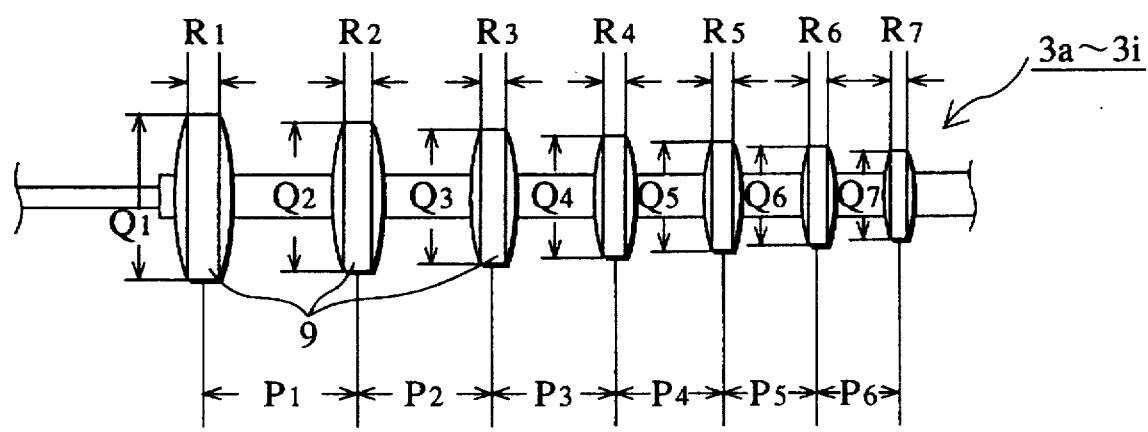
FIG. 2 is an enlarged view showing a roller having convexed rings shown in FIG. 1.

A first half portion of each of the rollers 3a to 3i towards the supporting frame 2 is provided with seven annular convexed rings 9 on its outer peripheral surface, as shown in FIG. 2. The pitches $P_1$ to $P_6$, the diameters $Q_1$ to $Q_7$ and the widths $R_1$ to $R_7$ of the convexed rings 9 are selected so as to be gradually decreased from the supporting frame 2 towards the supporting plate 4 in FIG. 1 so that the ratios $P_6/P_1$, $Q_7/Q_1$ and $R_7/R_1$ amount to 0.9. A second half portion of each of the rollers 3a to 3i towards the supporting plate 4 is a smooth cylinder. Since the changes in the pitches, the diameters and the widths of the convexed rings shown in FIG. 1 are only small in contrast to the size of the entire apparatus, they are shown with substantially the same size which is different from actual sizes.

Figure 3:
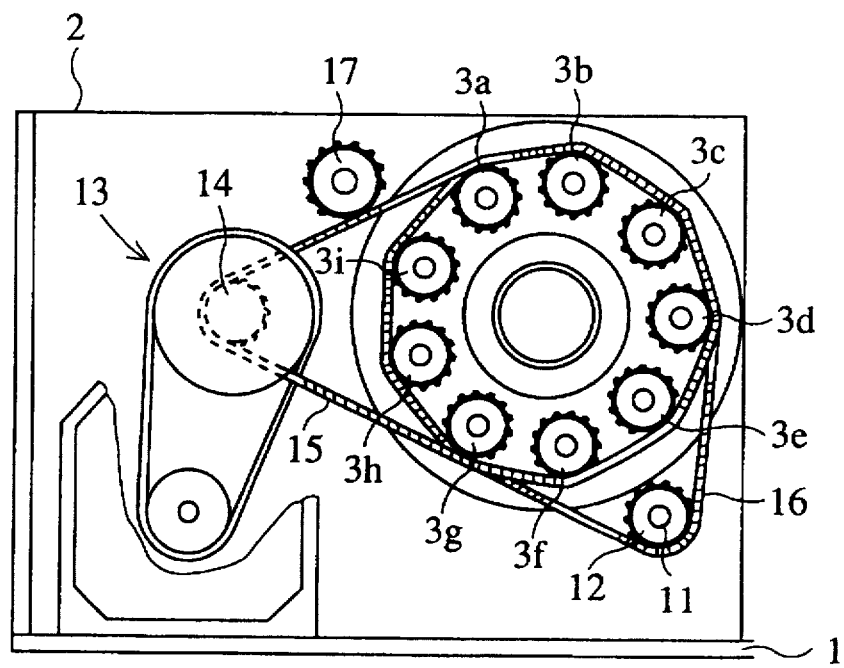
FIG. 3 is a schematic back-side view showing the apparatus shown in FIG. 1.

The supporting plate 4 is mounted on the distal end of a hollow base shaft 5 passed through the inside of the supporting frame 2. Shaft portions 6, 7 of each roller 3a to 3i is rotatably supported in bearings. Each shaft portion 6 passed through the supporting frame 2 is adapted to rotate at equal speed under the driving force of the motor 10 by interconnecting, by means of endless chains 15, 16, each sprocket loaded on each of the rollers 3a to 3i, as shown in FIG. 3, a sprocket 12 loosely mounted on a shaft 11 set on the supporting frame 2, and a sprocket 14 mounted on a speed-reducing unit 13 connected to the motor 10. A sprocket 17 is employed for tension adjustment of the endless chain 15. By such arrangement, when the sprocket 14 of the speed-reducing unit 13 is rotated by the motor 10, the sprockets of the rollers 3a to 3g are rotated by the movement of the endless chain 15 and, with the rotation of the endless chain 15, the endless chain 16 is moved to rotate the sprockets of the rollers 3a to 3i to cause the rotation of the rollers 3a to 3i at equal speed.

Figure 4:
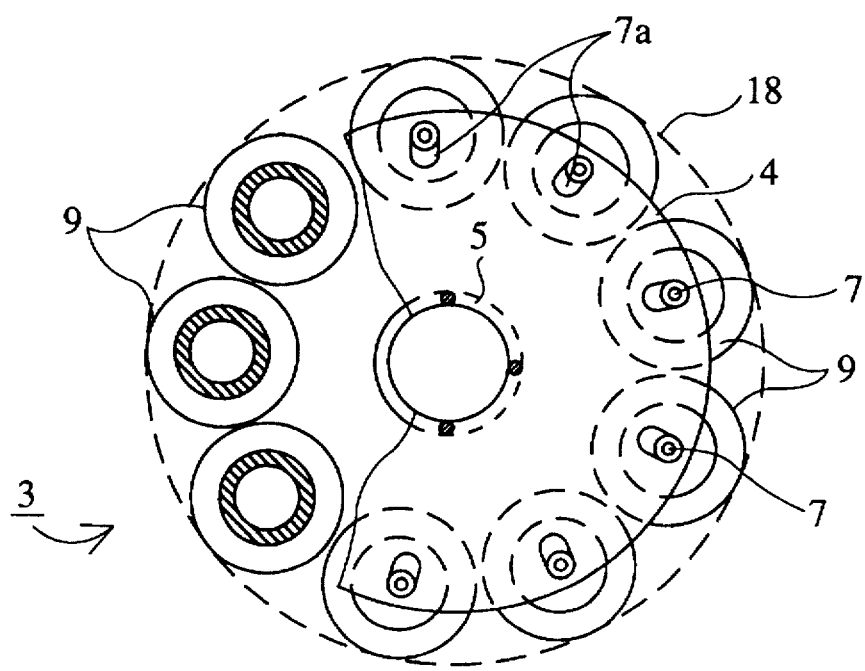
FIG. 4 is a front view showing a supporting plate in the apparatus, shown in FIG. 1, with only an arrangement of the rollers being schematically shown for ease of understanding.

Each shaft portion 7 passed through the supporting plate 4 is rotatably supported by being passed through each elliptically shaped bearing 7a (see FIG. 4) capable of adjusting the angle of inclination of the roller shaft. If the shaft portions 7 are supported at the radially outermost positions of the imaginary cylinder 18 as shown in FIG. 4, the rollers 3a to 3i of the roller assembly 3 are supported in their entirety in parallel with one another relative to the axial direction x of the base shaft 5 with an inclination angle of x-y. If each shaft portion 7 is supported by the elliptically shaped bearings 7a at the radially innermost positions of the imaginary cylinder 18, the roller assembly 3 may be supported so that the diameter of the imaginary cylinder 18 shown in FIG. 4 is gradually decreased in the direction proceeding from the supporting frame 2 towards the supporting plate 4. By supporting the shaft portions 7 so that the diameter of the imaginary cylinder 18 is decreased gradually, it becomes possible to prevent the spirally wound strip of synthetic resin A from being detached from the valleys of the rollers 3a to 3i as a result of contraction due to cooling of the strip A.

In FIG. 1, 19 is a pressure roller having a corrugated profile corresponding to the seven convexed rings 9 on the rollers 3a to 3i for pressing the strip of synthetic resin A discharged from the die 8 onto the peripheral surface of the roller assembly 3 for fixing the shape of the strip A. The pressure roller 19 is rotatably mounted externally of the roller assembly 3 constituting the imaginary cylinder. 20 is a guide roller for guiding the strip A as it is discharged onto the roller assembly 3. The guide roller 20 is mounted externally of and parallel to the roller assembly 3.

Figure 5:
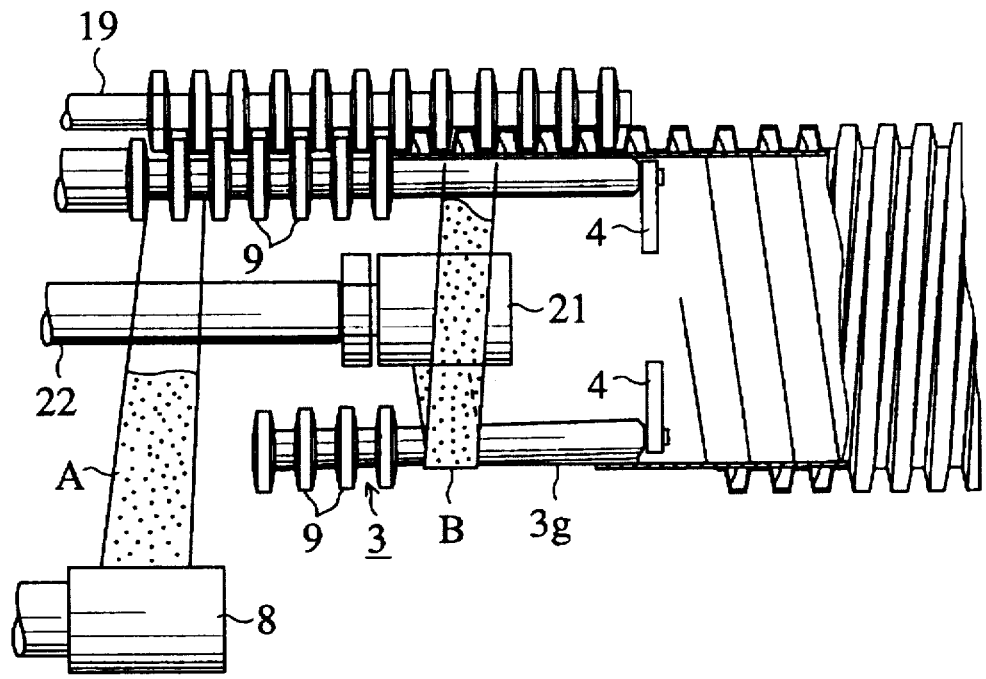
FIG. 5 is a schematic view showing perspectively the inside of a part of a roller assembly in the apparatus shown in FIG. 1.

In FIG. 5, 21 is a die for discharging a strip of synthetic resin B which forms a smooth cylindrical surface which is to become the inner wall surface of the corrugated tube. The die 21 is connected to a mandrel 22 mounted inside of the base shaft 5, and is mounted at a mid portion within the inside of the roller assembly 3 so that the strip of synthetic resin B is supplied to the smooth portions of the rollers 3a to 3i.

Within the inside of the rollers 3a to 3i, there is provided a known unit, not shown, for circulation of cooling water for cooling the strip of synthetic resin A which is wound spirally as it is discharged from the die 8.

The process for producing a corrugated tube using the above-described apparatus 1 is hereinafter explained.

Referring to FIG. 1, the strip of synthetic resin A discharged from the die 8 is continuously discharged via the guide roller 20 onto the outer periphery of the rollers 3a to 3i, while at the same time the motor 10 is driven in rotation for rotating the rollers 3a to 3i at equal speed matched to the rate of supply of the strip A. In this manner, the strip A is supplied sequentially to points m4, m3, m2 and m1 on the outer periphery of the roller assembly 3 shown in FIG. 1. After one round of the strip A is wound around the outer periphery of the roller assembly 3, that portion of the strip A which has made a complete round is partially overlapped with a portion of the strip A to be subsequently supplied in the similar manner, and is advanced by virtue of the inclination of the rollers 3a to 3i to form a complete turn of the helix. The strip A is moved past the pressure roller 19 in the vicinity of the roller 3i so that the strip A is fixed in a corrugated shape by the cross-sectional shape of the roller assembly 3 in cooperation with the contour of the pressure roller 19. When the strip A reaches the last convexed ring 9 provided on each of the rollers 3a to 3i, a strip of synthetic resin B is discharged from the die 21 shown in FIG. 5 and is supplied to the smooth portions of the rollers 3a to 3i. The strip B is advanced gradually and caused to be continuously bonded to the inner surface of the strip A wound. The strip B is in a helical form to define a cylindrical inner surface of the corrugated tube. The strip B is advanced in the direction of the supporting plate 4 by taking advantage of the inclination of the shafts of the rollers 3a to 3i, thereby continuously producing a corrugated tube having a double-wall structure comprising a corrugated outer wall and a smooth cylindrical inner wall.

The wave-shaped outer wall of the corrugated tube continuously produced in this manner is cured and contracted by being cooled by cooling means, not shown, provided within the inside of the rollers 3a to 3i. The pitches, the diameters and the widths of the convexed rings 9 provided on the rollers 3a to 3i are reduced in the direction proceeding from the supporting frame 2 towards the supporting plate 4 at rates related to the contraction percentages of the various portions of the strip A in the apparatus 1 as shown in FIG. 2. As a result, the wave-shaped outer wall of the corrugated tube is continuously formed without the strip A disengaging from the valley portion between the last convexed ring 9 and the second to last convexed ring 9 of each roller 3a to 3i, without being effected by the contraction of the strip A caused by cooling. Consequently, the corrugated tube produced is improved by increased molding shape stability and accuracy while being superior in durability. The molding shape stability and accuracy may be further improved by inclining the axial direction of each of the rollers 3a to 3i so as to gradually reduce the diameter of the roller assembly 3 in addition to the adjustment of the pitches, diameters and widths of the convexed rings.

Figure 6:
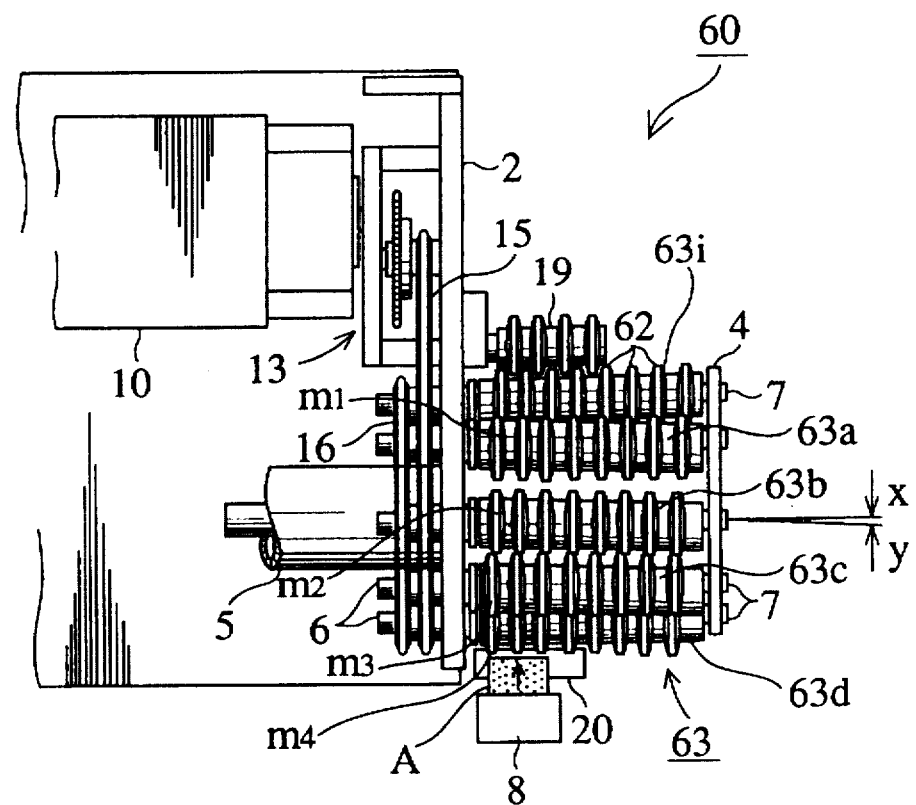
FIG. 6 is a schematic side elevational view showing an apparatus for producing a corrugated tube according to a modified embodiment of the present invention.

Referring to FIG. 6, 60 is an apparatus for producing a corrugated tube according to a modified embodiment of the present invention. The apparatus 60 includes nine rollers 63a to 63i in place of the roller assembly of the apparatus 1 shown in FIG. 1, wherein the rollers 63a to 63i are each provided with eight convexed rings 62 at the same pitch. Incidentally, the die 2 for forming the smooth inner surface shown in FIG. 5 is not installed. The embodiment shown in FIG. 6 is otherwise the same as that shown in FIG. 1, so that various parts or components of the present embodiment are denoted by the same reference numerals and the corresponding description is not made.

Figure 7:
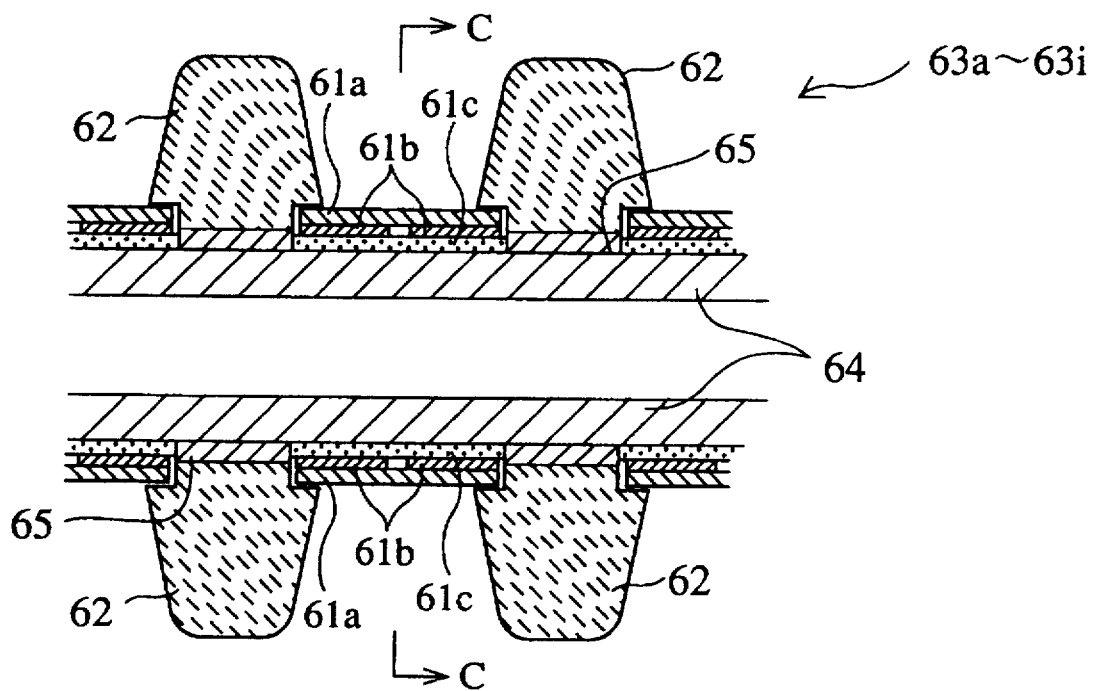
FIG. 7 is an enlarged schematic partial cross-sectional view of a roller shown in FIG. 6.
Figure 8:
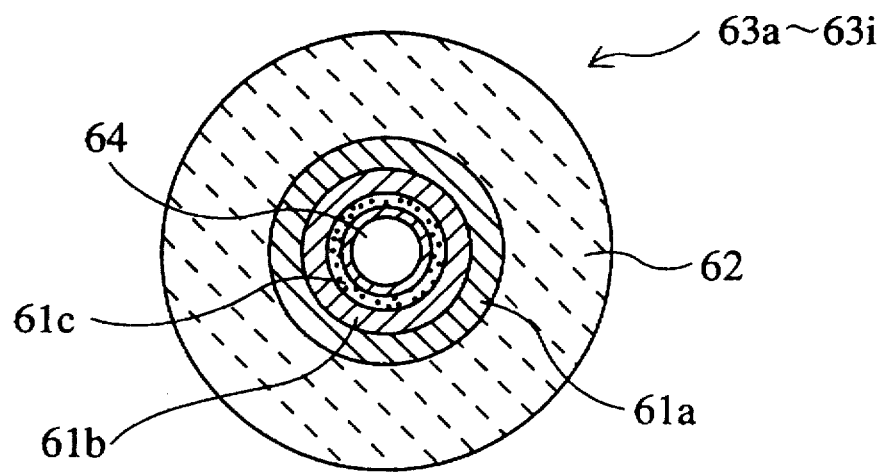
FIG. 8 is a schematic cross-sectional view taken along line 8—8 in FIG. 7.

FIG. 7 shows the rollers 63a to 63i shown in FIG. 6 by a partially enlarged cross-sectional view, and FIG. 8 is a cross-section taken along line 8—8 in FIG. 7.

Each of the rollers 63a to 63i is formed with convexed rings 62 of the same shape and size. On a roll substrate 64 in each valley portion between neighboring convexed rings 62, each follower ring 61a is rotatably mounted via dry bearings 61b and a positioning fixture 61c fixed by a fitting 65 without regard to the rotation of the roll substrate 64. Cooling means, not shown, for circulating cooling water in a manner well-known per se, is provided internally of each of the rollers 63a to 63i.

The method for producing a corrugated tube by the above-described apparatus 60 is hereinafter explained.

Referring to FIG. 6, the strip of synthetic resin A discharged from the die 8 is continuously discharged onto the outer periphery of the rollers 63a to 63i via the guide roller 20. Simultaneously, the motor 10 is driven in rotation for rotating the rollers 63a to 63i at equal speed matched to the supply rate of the strip A. In this manner, the strip A is supplied sequentially to points m4, m3, m2 and m1 on the outer periphery of the roller assembly 63 shown in FIG. 6. After one round of the strip A is wound around the outer periphery of the roller assembly 63, that portion of the strip A which has made a complete round is partially overlapped with a portion of the strip A subsequently supplied to make the round in a similar manner, and is advanced by virtue of the inclination of the rollers 63a to 63i to form a complete turn of the helix. The strip A is moved past the pressure roller 19 in the vicinity of the roller 63i so that the strip A is shaped in a corrugated shape by the cross-sectional shape of the roller assembly in cooperation with the contour of the pressure roller 19.

On the other hand, as the strip A is moved as described above, when the strip A is supplied to both the convexed rings 62 and the follower rings 61a provided adjacent to the convexed rings of each of the rollers 63a to 63i, the strip portions at the follower rings 61a are rotated at the fastest circumferential speed at each apex of the convexed rings 62 without regard to the rotation at the axial center of each of the rollers 63a to 63i. Since the follower rings 61a are rotated at a speed corresponding to the circumferential speed at the apexes of the convexed rings 62 due to transfer of rotational force of the strip A without regard to the rotation of the rollers 63a to 63i, it becomes possible to eliminate the internal strain of the strip A due to the difference in the circumferential speed between the apex of the convexed ring 62 and the roll substrate 64. The result that the longitudinal creases usually produced between the convexed rings 62 and the valley portions with the use of conventional rollers not provided with the follower rings may be prevented from being produced. As a consequence, a spiral-shaped corrugated tube having excellent durability may be produced by employing the rollers 63a to 63i provided with the follower rings 61a.

Figure 9:
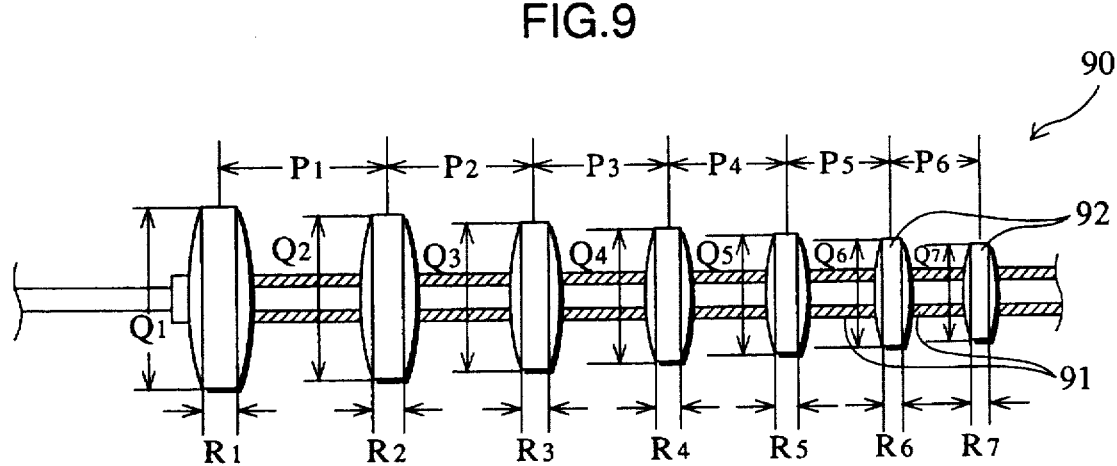
FIG. 9 is an enlarged schematic view of a roller having convexed rings and follower rings provided in valley portions between neighboring convexed rings, with the pitch between neighboring convexed rings and the diameters and the widths of the convexed rings being decreased gradually along the axial direction.
Figure 7:
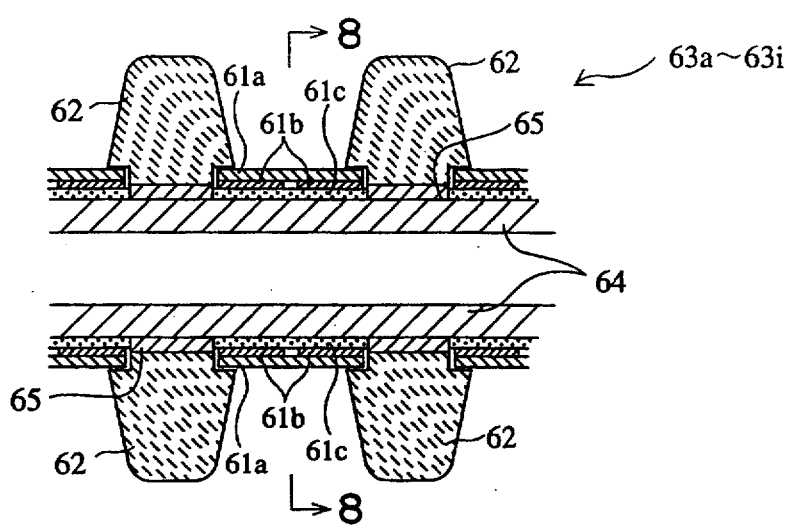

In FIG. 9, 90 is a roller in which the pitches $P_1$ to $P_6$, diameters $Q_1$ to $Q_7$ and widths $R_1$ to $R_7$ of the convexed rings 92 are gradually reduced, in a manner similar to the rollers 3a to 3i shown in FIG. 2. The follower ring 91, like the follower ring 61a which is rotatably mounted via dry bearing 61b on a positioning fixture 61c shown in FIG. 7, is mounted in the valley portions between the convexed rings 92

By employing the roller 90 in place of the rollers in the apparatus 1, 60 shown in FIGS.1 or 6, is prevented the strip of synthetic resin is prevented from being detached from the roller surface due to contraction of the strip. Thus, it is possible to produce a corrugated tube which is excellent in molding shape stability, accuracy and durability, and which has increased impact strength or pressure resistance. The tube is not susceptible to internal stresses manifested as longitudinal creases between the convexed rings and the valley portions between the convexed rings.

What is claimed is:

1. An apparatus for producing a corrugated tube comprising a roller assembly composed of a plurality of rollers, each being rotatable at equal speed, said roller assembly substantially forming a single rotating axial body so that said rollers are arrayed on a cylindrical surface of an imaginary cylinder, roller supporting means mounted axially opposite said roller assembly for rotatably supporting said rollers, means for continuously supplying a synthetic resin strip to an outer circumferential surface of said roller assembly from a lateral side thereof, and driving means for rotating said rollers at equal speed, each axis of said rollers being inclined in a circumferential direction of the roller assembly, plural convexed rings provided along the axial direction of each of said rollers being arrayed so that the convexed rings form a helix in their entirety, with a pitch between the convexed rings and diameters and widths of said convexed rings on each of said rollers being gradually reduced in accordance with a contraction percentage of said synthetic resin strip at least within a section of said rollers in which the synthetic resin strip spirally wound and advanced along the axis of said roller assembly is contracted.

2. The apparatus of claim 1 further comprising a pressure roller having plural convexed rings mating with the convexed rings of at least one of said rollers for fixing a shape of said strip wound and advanced in a helix.

3. The apparatus of claim 1 further comprising inner cylindrical wall forming means for forming a smooth cylindrical wall of synthetic resin on an inner peripheral surface of said imaginary cylinder for providing a dual wall for the corrugated tube.

4. The apparatus of claim 1, wherein each axis of the rollers is further inclined toward a central axis of said roller assembly at an equal angle so that a diameter of said imaginary cylinder is gradually decreased along the axially extending direction.

5. The apparatus of claim 4 wherein each axis of said rollers is further inclined toward the central axis of said roller assembly by means of inclined angle adjustment means provided in at least one of the roller supporting means.

6. The apparatus of claim 1, wherein a rate of reduction of the pitch between the convexed rings and the diameter and the width of the convexed rings is set so that $0.8<Y/X<1$, where X denotes each value of the pitch between the convexed rings and the diameter and the width of the convexed rings at a supplying point of said strip and Y is a minimum value thereof.

7. An apparatus for producing a corrugated tube comprising a roller assembly composed of a plurality of rollers, each being rotatable at equal speed, said roller assembly substantially forming a single rotating axial body so that said rollers are arrayed on a cylindrical surface of an imaginary cylinder, roller supporting means mounted axially opposite said roller assembly for rotatably supporting said rollers, means for continuously supplying a synthetic resin strip to an outer circumferential surface of said roller assembly from a lateral side thereof, and driving means for rotating said rollers at equal speed, each axis of said rollers being inclined in a circumferential direction of the roller assembly, plural convexed rings provided along the axial direction of each of said rollers so that the convexed rings form a helix in their entirety, with a pitch between the convexed rings and diameters and widths of said convexed rings on each of said rollers being gradually reduced in accordance with a contraction percentage of said synthetic resin strip at least within a section of said rollers in which the synthetic resin strip spirally wound and advanced along the axis of said roller assembly is contracted, a follower ring being provided at each recessed valley portion between neighboring convexed rings, said follower rings being rotatable responsive to circumferential speed at an apex of said convexed rings.

8. The apparatus of claims 7 further comprising a pressure roller having plural convexed rings mating with the convexed rings of at least one of said rollers for fixing a shape of said strip wound and advanced in a helix.

9. The apparatus of claim 7 further comprising inner cylindrical wall forming means for forming a smooth cylindrical wall of synthetic resin on an inner peripheral surface of said imaginary cylinder for providing a dual wall for the corrugated tube.

10. The apparatus of claim 7, wherein each axis of the rollers is further inclined toward a central axis of said roller assembly at an equal angle so that a diameter of said imaginary cylinder is gradually decreased along the axially extending direction.

11. The apparatus of claim 10 wherein each axis of said rollers is further inclined toward the central axis of said roller assembly by means of inclined angle adjustment means provided in at least one of the roller supporting means.

12. The apparatus of claim 7, wherein a rate of reduction of the pitch between the convexed rings and the diameter and the width of the convexed rings is set so that $0.8<Y/X<1$, where X denotes each value of the pitch between the convexed rings and the diameter and the width of the convexed rings at a supplying point of said strip and Y is a minimum value thereof.

* * * * *

UNITED STATES PATENT AND TRADEMARK OFFICE
CERTIFICATE OF CORRECTION

PATENT NO. : 5,593,535  Page 1 of 2
DATED : January 14, 1997
INVENTOR(S) : Noboru HASEGAWA et al.

It is certified that error appears in the above-indentified patent and that said Letters Patent is hereby corrected as shown below:

In the Drawing:

Delete FIG. 7 and substitute attached FIG. 7.

In the Specification:

Col. 6, line 44, delete "wound";
       line 45, after "is" insert --wound--.
Col. 8, line 18, delete "is prevented".

Signed and Sealed this

Twenty-second Day of July, 1997

Attest:

BRUCE LEHMAN

Attesting Officer        Commissioner of Patents and Trademarks